W. H. VIBBER.
PIPE CONDUIT FITTING FOR ELECTRIC INSTALLATION.
APPLICATION FILED OCT. 3, 1910.
1,064,402.
Patented June 10, 1913.
2 SHEETS—SHEET 1.
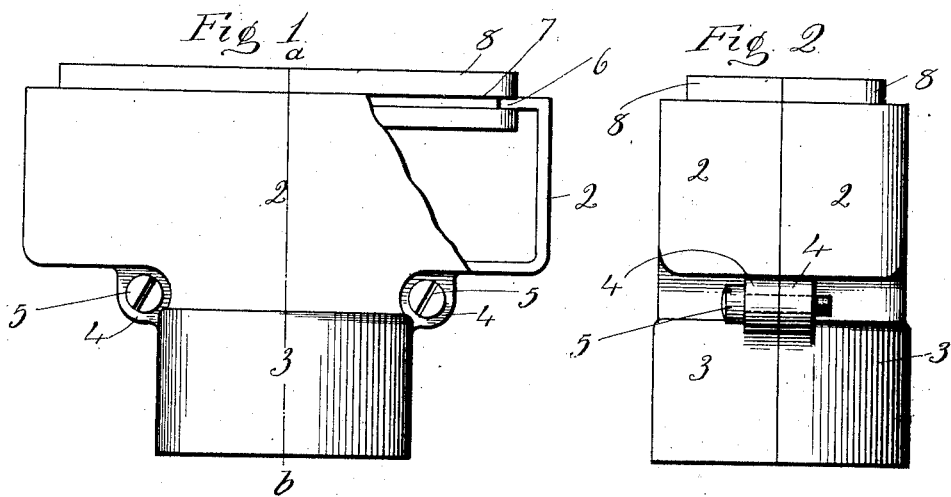
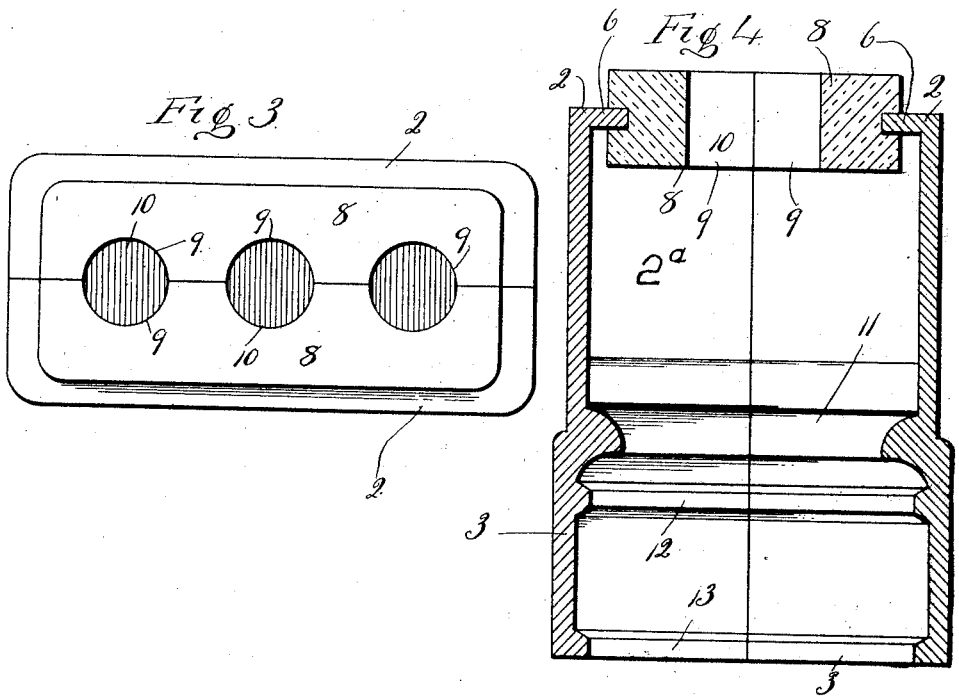
Witnesses
C. J. Reed
C. L. Need
Inventor
Wheeler H. Vibber
By Attys W. H. VIBBER.
PIPE CONDUIT FITTING FOR ELECTRIC INSTALLATION.
APPLICATION FILED OCT. 3, 1910.

1,064,402.

Patented June 10, 1913.

2 SHEETS—SHEET 2.

Witnesses
C. J. Reed
C. L. Weed

Inventor
Wheeler H. Vibber
By Att'ys
Seymour Earle
Frederic Earle

UNITED STATES PATENT OFFICE.

WHEELER H. VIBBER, OF NEW LONDON, CONNECTICUT, ASSIGNOR OF ONE-HALF TO THE GILLETTE-VIBBER CO., OF NEW LONDON, CONNECTICUT, A CORPORATION.

PIPE-CONDUIT FITTING FOR ELECTRIC INSTALLATION.

1,064,402.   Specification of Letters Patent.   Patented June 10, 1913.

Application filed October 3, 1910. Serial No. 585,118.

*To all whom it may concern:*

Be it known that I, WHEELER H. VIBBER, a citizen of the United States, residing at New London, in the county of New London and State of Connecticut, have invented a new and useful Improvement in Pipe-Conduit Fittings for Electric Installation; and I do hereby declare the following, when taken in connection with the accompanying drawings and the letters of reference marked thereon, to be a full, clear, and exact description of the same, and which said drawings constitute part of this specification, and represent, in—

Figure 5:
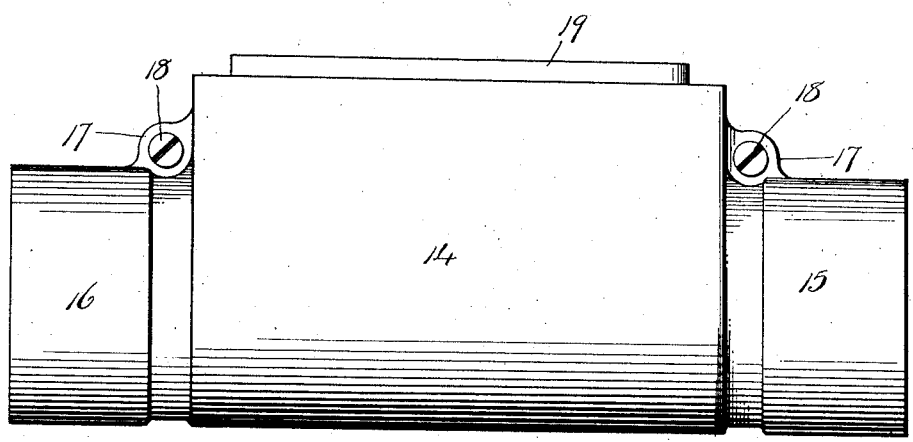
Figure 6:
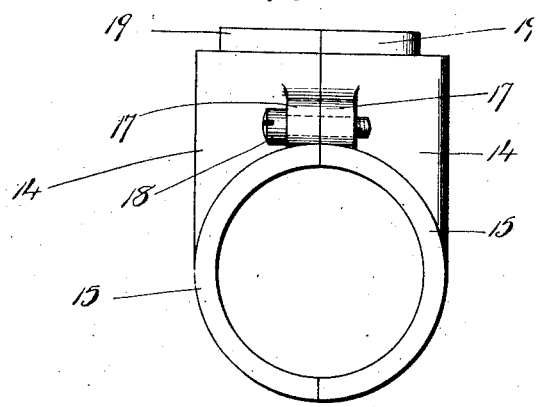

Figure 1 a view in side elevation of a terminal-fitting constructed in accordance with my invention, one end of the body-portion of one of the two half-sections being broken away. Fig. 2 a view of the fitting in end elevation. Fig. 3 a plan view thereof. Fig. 4 a view in vertical section on the line *a—b* of Fig. 1. Fig. 5 a view in side elevation of a junction-fitting constructed in accordance with my invention. Fig. 6 an end view thereof.

My invention relates to an improvement in pipe-conduit fittings for electric installation with unthreaded conduits, the object being to produce a simple and compact fitting constructed with particular reference to ease and convenience of application and removal.

With these ends in view, my invention consists in a pipe-conduit fitting having certain details of construction as will be hereinafter described and pointed out in the claim.

In carrying out my invention as shown in Figs. 1 to 4 inclusive, my improved fitting consists of two corresponding unthreaded half-sections, each half-section being cast in one piece and each comprising an oblong hollow body-portion 2 and a semi-circular centrally arranged outlet-portion 3. Each half-section is also formed at each end with a perforated lug 4 for the reception of binding screws 5. As shown each half-section is formed at the open end of its body-portion with an inwardly extending horizontally arranged retaining-flange 6 entering longitudinal grooves 7 in the sides and ends of porcelain insulating frames 8 each of which is formed upon its inner edge with three transverse semi-circular grooves 9. Each of the flanges 6 consists of a long straight side member and two relatively short parallel end-members extending at a right angle thereto, while the grooves 7 in the sides and ends of the frames 8 have corresponding side and end portions. When the fitting is assembled, the retaining-flanges 6 of the body-portions 2 of the fitting combine to form a rectangular opening in which the flanges suspend, as it were, the rectangular closure formed by placing the two porcelain frames 8 in juxtaposition. When the fitting is assembled also, the grooves 9 of the frames 8 register, as shown in Fig. 3, and form circular openings 10 for the passage of cables into the main body-portion of the fitting. Each of the half-sections is formed on the inside and between its body-portion 2 and its outlet-portion 3, with a horizontally arranged stop-shoulder 11 which is abutted against the end of the conduit and positions the fitting thereupon. The outlet-portion 3 of each half-section is also formed upon its inner face with gripping ribs 12 and 13 which serve to heighten the grip of the fitting upon the conduit.

By making the fitting in two half-sections each consisting of a body-portion and an outlet-portion, I secure a singularly simple and compact construction and one adapted to be applied and removed with the utmost convenience. This principle of construction may obviously be applied to pipe-conduit fittings adapted in their form to be used in different situations, and to pipe-conduit fittings having more than one outlet. Thus the fitting shown in Figs. 1 to 4 inclusive is what is known as a "terminal" fitting. In Figs. 5 and 6 I have shown a fitting designed to be used as a "junction" fitting and so known. This consists of two corresponding half-sections each consisting of an oblong body-portion 14 formed at its respective ends with corresponding integral outlet-portions 15 and 16. Each of these half-sections is also formed with two perforated ears 17 for the reception of binding-screws 18. These half-sections are also adapted to receive insulating frames 19 like the frames 8 already described, and secured in place in the same way. The construction shown by Figs. 5 and 6 is sufficient to indicate the feasibility of applying my invention to different forms of pipe-conduit fittings.

My improved fittings when constructed as described, are provided with large chambers which, on account of their unobstructed character, give the largest possible opportunity for the reception of cables and for splicing operations. I wish also to call particular attention to the fact that my improved fitting may be applied to an unthreaded pipe-conduit after the wires are all in and connected up, without cutting away any of them since both of the corresponding half-sections of the fitting and both of the corresponding half-sections of the insulating-frame may be readily applied to the pipe-conduits and to the wires after the same are all in position, without cutting them or in any way disturbing them; whereas pipe-conduit fittings as heretofore constructed have not permitted this to be done, but have compelled the electrician to install at least a part of the fitting before running and connecting the wires.

I claim:—

In a pipe-conduit fitting for electric installation with pipe-conduits, the combination with two corresponding fitting-sections each comprising an oblong body-portion having a single unobstructed oblong half-chamber provided at its open end with means for retaining in place a half-section of a two-part sectional insulating-frame, and also comprising a semi-circular outlet-portion formed near its inner end with a semi-circular abutment or positioning-flange, and with a shallow semi-circular clearance groove flanked by semi-circular gripping-ribs; of two corresponding insulating frame-sections adapted to be held by the said retaining means within the open ends of the fitting-sections when the same are clamped upon a pipe-conduit; and clamping devices for clamping the two fitting-sections upon the end of a pipe-conduit, whereby the entire fitting may be applied to a pipe-conduit after the wires have been run through the same and connected up, without cutting any of the wires.

In testimony whereof, I have signed this specification in the presence of two subscribing witnesses.

WHEELER H. VIBBER.

Witnesses:
 CLARA L. WEED,
 FREDERIC C. EARLE.